June 9, 1964     W. L. S. DE RIEUX ET AL     3,136,045
METHOD OF RECLAIMING AND SEGREGATING METALS FROM ELECTRIC CABLE
Filed March 30, 1962     2 Sheets-Sheet 1
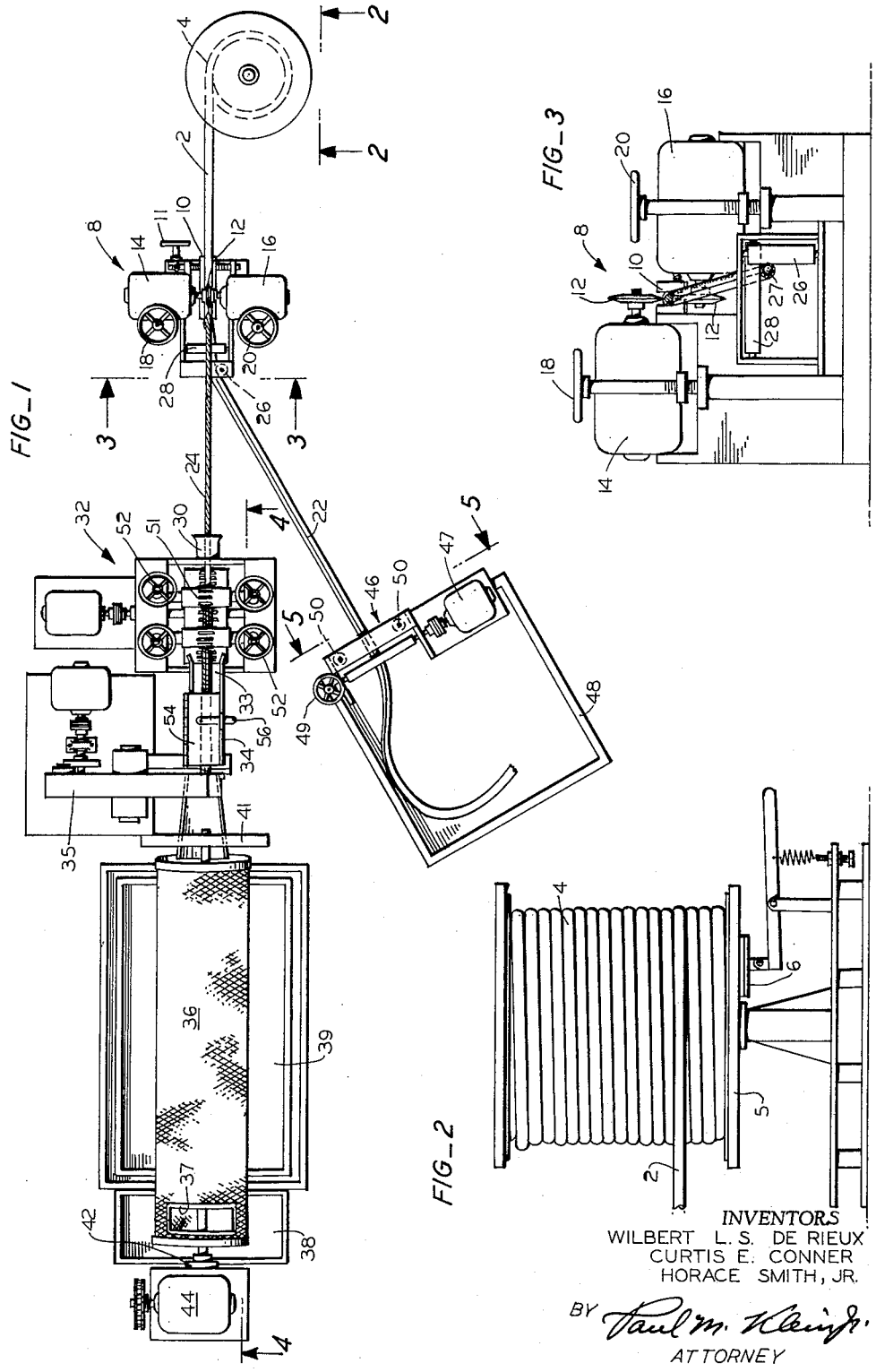
INVENTORS
WILBERT L. S. DE RIEUX
CURTIS E. CONNER
HORACE SMITH, JR.
BY
ATTORNEY

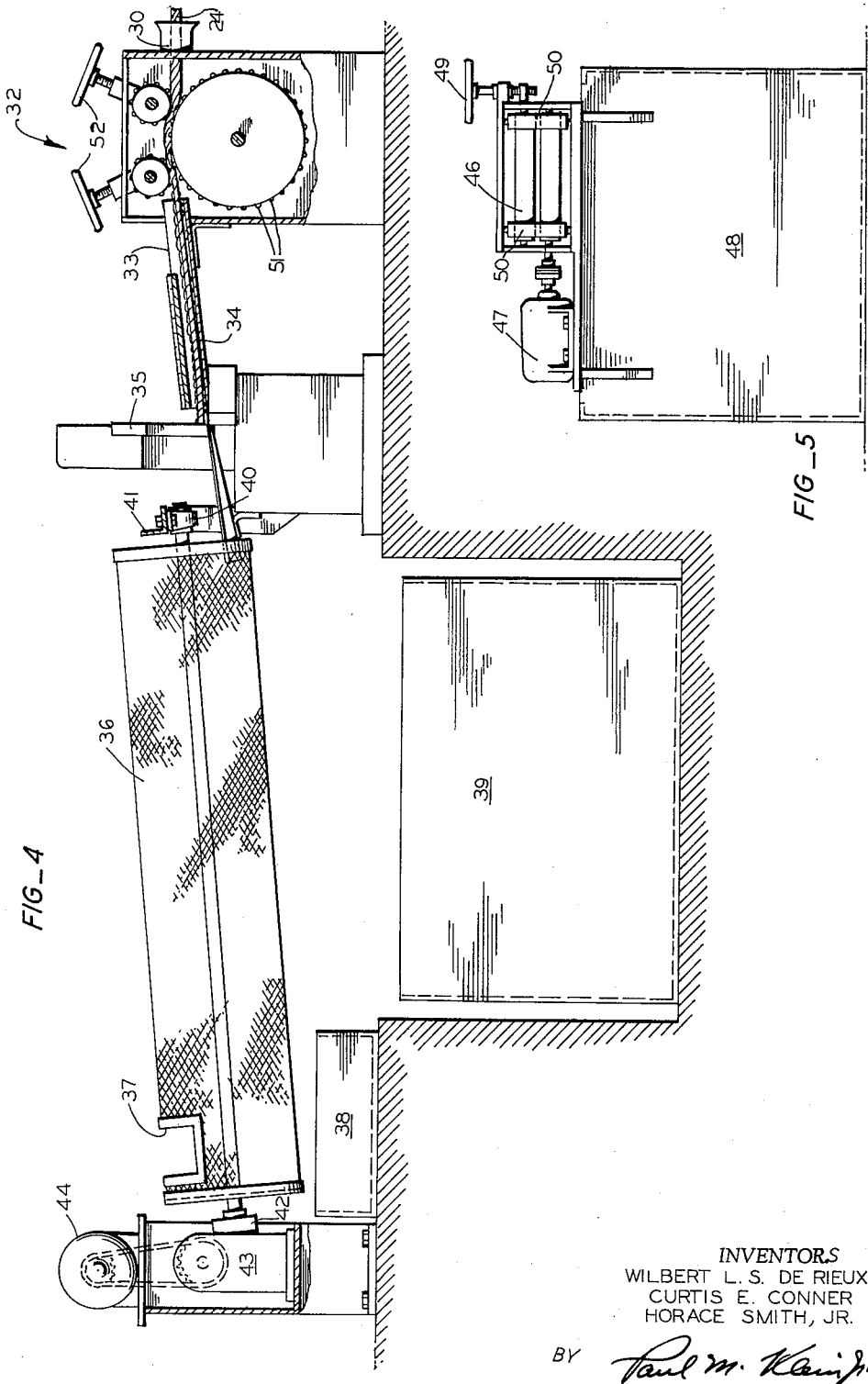

United States Patent Office 3,136,045
Patented June 9, 1964

3,136,045
METHOD OF RECLAIMING AND SEGREGATING METALS FROM ELECTRIC CABLE
Wilbert L. S. De Rieux, 1874 Klauber Ave., San Diego 14, Calif.; Curtis E. Conner, 2163 Drescher St., San Diego, Calif.; and Horace Smith, Jr., 702 S. 42nd St., San Diego 15, Calif.
Filed Mar. 30, 1962, Ser. No. 183,980
6 Claims. (Cl. 29—403)
(Granted under Title 35, U.S. Code (1952), sec. 266)

The invention described herein may be manufactured and used by or for the Government of the United States of America for governmental purposes without the payment of any royalties thereon or therefor.

This invention relates to a method for reclaiming and segregating metals from electric cable.

The prior art practice for salvaging metals from electric cable left considerable to be desired. A typical electric cable, exemplified by one type of submarine communications cable, is composed of an outer sheath of plastic or rubber, an inner shield of steel wire wrapping which, in the case of cable having a diameter from 1½" to 2½", is composed of ⅛" to ³⁄₁₆" wire, and a central insulated multi-conductor copper core. The common prior art method for salvaging such a cable has been to cut it into convenient lengths, say 3 feet long, and sell it in these cut pieces. The buyer then hauls it to an isolated area and burns the insulation off, leaving the steel and copper. The steel usually comes through the fire in good condition, but much of the copper is destroyed or made so brittle it falls apart during the process of segregating it from the steel. The processing is all hand work and consequently costly. The net result of the deficiencies of this process is that the buyer of the cable to be salvaged offers a relatively low price for it.

An object of the present invention is to provide a method for reclaiming and segregating metals contained in an electric cable which is susceptible to almost complete mechanization and which segregates the several constituents of the cable without so altering their character as to reduce the salvage value, but rather to increase their salvage value.

Other objects and many of the attendant advantages of this invention will be readily appreciated as the same becomes better understood by reference to the following detailed description when considered in connection with the accompanying drawings wherein:

FIG. 1 is a plan view of an apparatus adapted for carrying out the method of the invention;

FIG. 2 is an elevation view of a coil of cable on reel as seen along the line 2—2 in FIG. 1;

FIG. 3 is an elevation view taken along the line 3—3 in FIG. 1 of equipment for slitting the covering of a cable;

FIG. 4 is an elevation view, taken along line 4—4, partly in cross-section, of part of the apparatus of FIG. 1; and FIG. 5 is an elevation view taken along the line 5—5 in FIG. 1 of the automatic feed for removing slit covering from cable.

The method of the invention will be described with reference to an electric cable of a type used for submarine communication which consists of an outer plastic or rubber sheath, an inner layer of steel wire wrapping, and an inside central core of insulated copper. It is to be understood, however, that the method of the invention is applicable generally to various types of cables, the construction of several exemplary types of which will be later described.

In the typical case of the cable chosen for an illustration, the protective wire wrapping, composed of steel wires laid helically around the inner core, adheres rather tenaciously to the inner core, probably because of the pressure and presence of insulating material around the core present in the fabrication of the cable. As applied to this cable chosen for illustration, the method of the invention comprises removing the outer sheath from the cable, squeezing the cable sufficiently to somewhat loosen the wrapping of protective wires from the inner copper core, cutting the cable into pieces of convenient length, agitating the cut pieces of cable to disengage the protective wires from the central core, and screening the pieces of core and pieces of protective wire to segregate them from one another.

Conveniently the removal of the outer sheath can be accomplished by slitting it either at one or two places, for example, at the top and/or at the bottom. Conveniently the agitating step can be accomplished jointly with the screening step by agitating cut pieces of unsheathed cable in a screening apparatus of any convenient type, such as an inclined perforated tumbler, a vibratory screen or sieve mechanism or the like, or similar equipment.

Specifically, a preferred embodiment of the method of the invention comprises the steps of feeding the cable automatically in an essentially continuous fashion from a supply coil or the like, conveniently on a reel or drum or the like. While the cable is so fed, the outer sheath is slit and as the cable travels, the slit sheath is automatically pulled off the cable in an essentially continuous fashion. The unsheathed cable is squeezed to loosen the wrapping of protective wires and predetermined lengths are then cut from the free end of the cable. These cut lengths of cable are agitated to disengage the wrapping wires from the pieces of core and then screened to segregate the pieces of core from the wrapping wires. Preferably, as the outer sheath is being pulled away from the cable, the pulling is accomplished in such a manner that the effective automatic separation of the sheath from the cable is undisturbed by variation in the usual speed of travel of the cable, whether it be a small change in speed or a complete halt of the passage of the cable. This manner of pulling the sheath away from the cable can be insured by providing a grip, by the apparatus which removes the sheath, that will slip if the sheath excessively resists pulling. Stated in another way, this step of the method involves exerting an essentially constant tension on the sheath to pull it away from the cable regardless of variations in the speed of travel of the cable.

Other aspects of the method of the invention, and a detailed understanding of the method will be apparent from the following description of one apparatus for carrying out the method of the invention and the description of the operation of this apparatus.

Reference is now made to the drawings. In FIG. 1 there is shown a cable 2 to be salvaged, shown in a coil mounted on a reel 4 of any convenient type of construction. The reel is shown in FIGS. 1 and 2 as mounted on a turntable 5. To maintain proper tension on the cable and to prevent backlash and reversal of the rotation of the reel, an adjustable brake 6 is used which can consist simply of a spring-pressed brake shoe acting against the turntable. The cable is fed off the reel through a slitter shown generally at 8. This slitter is shown as composed of an adjustable guide 10 for the cable which guides the cable where its cover can be slit by either or both of two rotary cutters 12. The guide 10 can be adjusted by handwheel 11 for different sizes of cable. Each rotary slitting knife is driven by its own independent motor 14 or 16, the motor 14 driving a cutter adapted to cut the upper region of the cable and the motor 16 being adapted to cut the cable from below. The motor driven cutters are each independently movable by hand wheels 18, 20, to engage the cutter with the cable at any desired depth.

For guiding the slit sheath 22 away from the unsheathed cable 24 a vertical roller 26 is provided (FIGS. 1, 3). A horizontal roller 28 facilitates the transport of the unsheathed cable 24 away from the slitter into a tubular or funnel-like guide 30 (FIGS. 1, 4) leading the cable into an adjustable speed feed roller mechanism generally indicated at 32.

The feed roller mechanism in turn feeds the cable through the open channel portion 33 of a restraining guide 34 and thence through its covered portion into a continuously operated alligator shear 35. The pieces of cable, which can be cut to any convenient length such as say from 4″ to 16″, fall into a tumbler type wire mesh container 36. The tumbler is set on an incline sloping away from the shear and as it revolves the steel wire covering shakes loose from the insulated copper core and falls through the mesh of the tumbler; the pieces of insulated copper wire core, being too large to fall through the mesh of the tumbler, work their way to the lower end and fall out through an opening 37 provided for that purpose and into a container 38 where they accumulate and are later removed. The steel wire, falling through the tumbler mesh, is caught in a container 39 placed under the tumbler.

The tumbler is mounted to turn in bearing 40 supported on frame 41 and in bearing 42 on a speed reduction drive 43 driven by motor 44.

To pull the slit sheath away from the cable an adjustable type roller 46, similar to a washing machine wringer is used. This roller is driven by motor 47 and is conveniently mounted on the side of a trash box or the like 48. The end of the insulation is started into the roller by the operator and just enough pressure is applied to the rolls by pressure control wheel 49 to cause them to pull the insulation off the cable as it is slit. The sheath is guided into the roller 46 by one or another guide roller 50. If for any reason the stripper stops, the rolls will slip. The slippage also allows for variations in the speed of the cable passing through the stripper. The insulation is discharged from the roller into the trash box on which it hangs.

The feed rollers for the cable as shown especially in FIGS. 1 and 4 are preferably provided with serrations or the like 51, which can conveniently be formed by simply running a series of weld beads onto the rollers. By means of the hand wheels 52 the pressure on the feed rollers is maintained sufficiently high so that the serrations grip and squeeze the cable to facilitate loosening the lay of the protective wire wrapping (as particularly evident in FIG. 4). This loosening facilitates the disengagement of the protective steel wires from the copper core as the cut pieces of cable are agitated in the tumbler 36. As previously mentioned, the restraining guide 34, with its cover 54, serves to prevent the cable from whipping or bouncing around as the shear 35 cuts pieces off its end. The cover 54 is provided with any convenient latch such as 56 to normally retain it in covering position.

Although the method of this invention has been described as applied to one particular type of cable, it is equally applicable to other types of cable. For example, one such type of underwater cable is composed of an outer cover of tarred fiber, then a layer of protective steel wires, then a lead sheath, and an inner core of individually insulated, multiple conductor copper cable. Another such type of underwater cable is composed of an outer cover or sheath of rubber, a layer of steel wires, a sheath of lead, and an inner core of multi-conductor insulated copper.

Another such type of cable in armored cable composed of an outer sheath or cover of woven steel and an inner core of insulated copper conductors. This armored cable is usually processed by slitting the outer sheath, essentially continuously pulling the slit outer sheath away from the cable, while the cable is essentially continuously fed from a supply reel, or the like. The cable with its outer sheath removed is preferably fed essentially continuously onto a drum or reel or the like, while the slit sheath is being pulled off and deposited in a box or the like, and this unsheathed cable can then be sold as insulated cable.

In the case of each type of cable the application of the method of the invention involves automatically continuously slitting the outer sheath or cover of the cable, as the cable is automatically continuously fed along its line of travel, and automatically continuously pulling the slit outer sheath away from the cable to remove it from the cable.

Obviously many modifications and variations of the present invention are possible in the light of the above teachings. It is therefore to be understood that within the scope of the appended claims the invention may be practiced otherwise than as specifically described.

What is claimed is:

1. The method of reclaiming and segregating metals contained in an electric cable including an outer sheath, an inner wrapping of protective wires, and a core of conductors, which method comprises slitting the outer sheath; removing the outer sheath; squeezing the unsheathed cable to deform it sufficiently to loosen the protective wires; cutting the cable into pieces of predetermined length; depositing said cut pieces of cable at the higher region of an inclined agitator having a plurality of perforations along its inclined length small enough to pass cut pieces of said protective wires but large enough to retain cut pieces of said core and having an opening near its lower end large enough to pass the cut pieces of core; subjecting said agitator to motion to disengage said protective wires from said core and cause said protective wires to discharge through said perforations and said core pieces to discharge through said lower opening; collecting said protective wires discharged through said perforations, and separately collecting said core pieces discharged through said opening.

2. The method of claim 1 wherein the cutting of the cable is accomplished by severing a piece of the cable from the free end thereof further including the step of restraining against undesired displacement that portion of the remainder of the cable lying adjacent the piece being severed.

3. The method of reclaiming and segregating metals from an electric cable, including an outer sheath, an inner wrapping of protective wires, and a core of conductors, which method comprises feeding the cable continuously from a supply coil or the like; slitting the outer sheath of said cable as it is fed along its direction of travel; essentially continuously pulling the slit sheath away from the cable; squeezing the unsheathed cable as it continues along its direction of travel to loosen the wrapping of protective wires; cutting predetermined lengths off the free end of the squeezed cable; agitating said cut lengths of cable to disengage said wrapping wires from the pieces of core; and screening said wrapping wires and said pieces of core to segregate them from one another.

4. The method of claim 3 wherein the tension on the outer sheath as it is being pulled away from the cable is maintained essentially constant regardless of variations in the speed of travel of the cable.

5. The method of claim 4 further including the step of restraining against undesired motion that portion of the remainder of the cable adjacent the piece being cut off.

6. The method of reclaiming and segregating salvageable components from an electric cable, including an outer sheath and an inner conductor core which comprises automatically feeding the cable continuously from a supply coil or the like; automatically continuously slitting the outer sheath of said cable as it is fed along its direction of travel; gripping said sheath to facilitate pulling said sheath and, through the use of the gripping action, automatically pulling said sheath away from the cable whereby to remove the sheath from the cable; and, at a location on said inner core from which said sheath has been removed, gripping said inner core to facilitate pulling said inner core, and, through the use of the gripping action, continuously pulling said inner core by exerting thereon a direct tensile stress so as to assist in feeding said cable from said supply coil or the like, to assist in the separation of said core and said sheath from one another, and to assist in the transport of that portion of said core from which said sheath has been removed.

References Cited in the file of this patent
UNITED STATES PATENTS

| | | |
|---|---|---|
| 1,521,103 | Jacobson | Dec. 30, 1924 |
| 1,941,364 | Nunninghoff | Dec. 26, 1933 |
| 2,046,341 | McParlin | July 7, 1936 |